(12) United States Patent
Irwin

(10) Patent No.: US 8,002,102 B2
(45) Date of Patent: Aug. 23, 2011

(54) APPARATUS FOR ORIENTING STACKS OF TRIMMED MOLDED ARTICLES AND METHOD

(76) Inventor: Jere F. Irwin, Yakima, WA (US)

( * ) Notice: Subject to any disclaimer, the term of this patent is extended or adjusted under 35 U.S.C. 154(b) by 698 days.

(21) Appl. No.: 11/877,341

(22) Filed: Oct. 23, 2007

(65) Prior Publication Data

US 2009/0104013 A1    Apr. 23, 2009

(51) Int. Cl.
*B65G 37/00* (2006.01)
*B65G 47/00* (2006.01)
*B65G 47/26* (2006.01)
*B65G 47/46* (2006.01)
*B65G 47/30* (2006.01)

(52) U.S. Cl. ........ 193/2 R; 198/367; 198/442; 198/368; 198/418.6

(58) Field of Classification Search .......... None
See application file for complete search history.

(56) References Cited

U.S. PATENT DOCUMENTS

| | | | |
|---|---|---|---|
| 3,759,303 A | 9/1973 | Henrichs et al. | |
| 3,802,819 A | 4/1974 | Alroy | |
| 3,884,366 A | 5/1975 | Leenaards | |
| 4,054,212 A | 10/1977 | Mueller | |
| 4,565,513 A | 1/1986 | Kiefer | |
| 4,771,876 A * | 9/1988 | Bandixen | 198/367 |
| 4,805,758 A | 2/1989 | Dominico et al. | |
| 5,067,341 A * | 11/1991 | Wynn et al. | 72/426 |
| 5,122,029 A | 6/1992 | DelDuca | |
| 5,192,181 A | 3/1993 | Bryde-Hansen | |
| 5,232,325 A | 8/1993 | Kohn et al. | |
| 5,234,313 A | 8/1993 | DelDuca | |
| 5,273,167 A | 12/1993 | Haas et al. | |
| 5,704,194 A | 1/1998 | Niehaus | |
| 5,797,720 A | 8/1998 | Ruh | |
| 5,888,046 A | 3/1999 | Salda et al. | |
| 6,241,457 B1 | 6/2001 | Huttig et al. | |
| 6,692,212 B2 | 2/2004 | Trautwein et al. | |

* cited by examiner

*Primary Examiner* — Gene Crawford
*Assistant Examiner* — Yolanda Cumbess
(74) *Attorney, Agent, or Firm* — Wells St. John P.S.

(57) ABSTRACT

A thermoformed article stack guiding apparatus is provided with a frame, a guide ramp and an array of juxtaposed article guide channels. The guide ramp receives and guides individual stacks of inter-nested articles exiting a female die of a thermoforming trim press from multiple rows and multiple levels. A first set of article guide channels is inter-nested with a second set of article guide channels in an alternating array. Each of the first set and the second set is spread out laterally in a direction from an entrance end of the guide ramp to an exit end of the guide ramp to accept respective stacks of inter-nested articles from an upper row and a lower row of a trim press and transfer the stacks into a common exit row. A method is also provided.

23 Claims, 8 Drawing Sheets

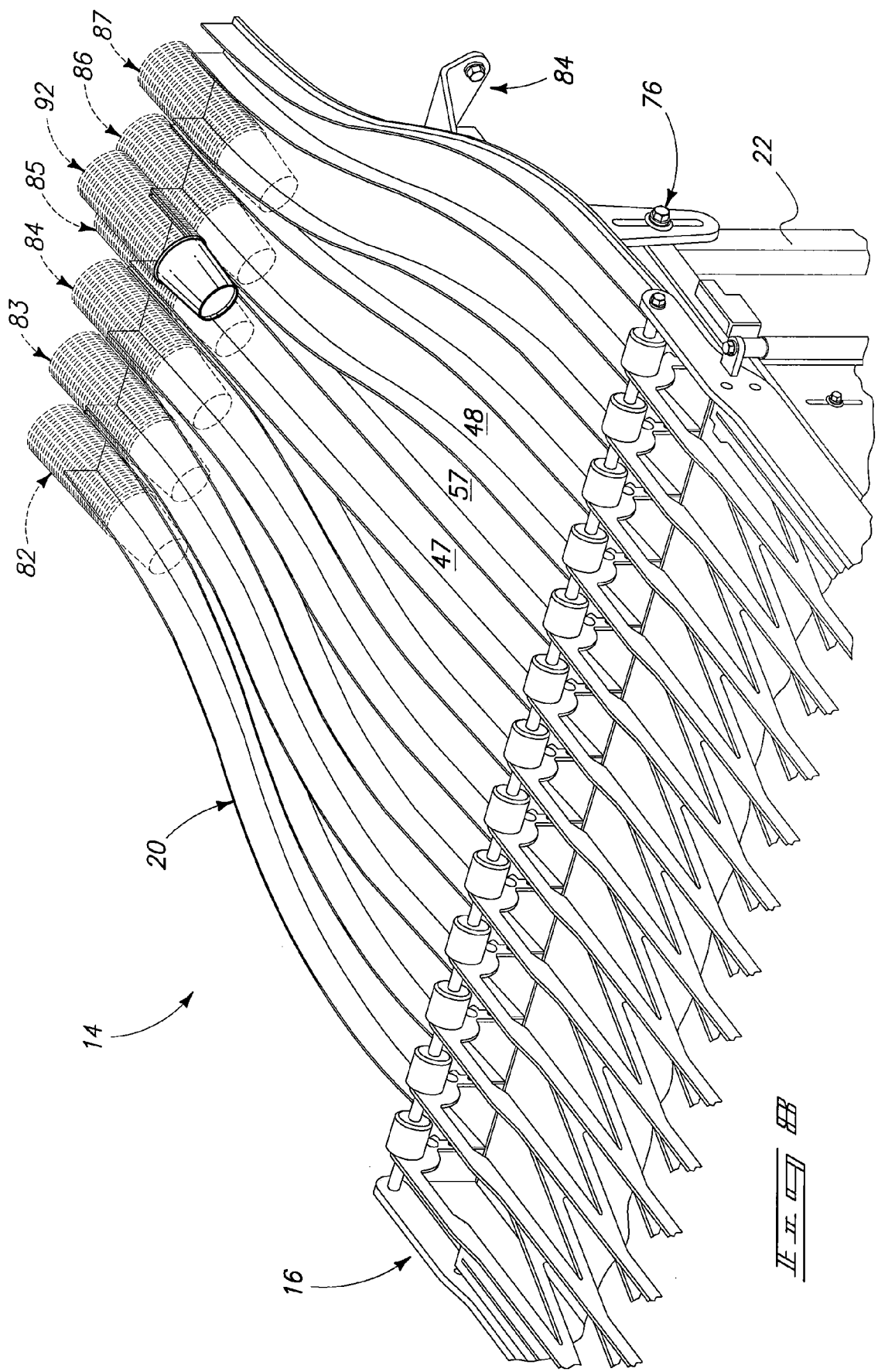

APPARATUS FOR ORIENTING STACKS OF TRIMMED MOLDED ARTICLES AND METHOD

TECHNICAL FIELD

This invention pertains to apparatus and methods for transferring trimmed molded articles from a thermoforming trim press. More particularly, the present invention relates to apparatus and methods for feeding inter-nested articles from multiple rows of dies on a thermoforming trim press into a single, common row for further processing.

BACKGROUND OF THE INVENTION

Apparatus and methods are known for delivering inter-nested articles from a single row of dies on a thermoforming trim press to a conveyor for further processing and packaging of stacks of the articles. Continuous stacks of inter-nested articles are delivered in a single row onto a table from the adjacent female dies of a thermoforming trim press. However, the provision of a single row of stacked articles means that the male and female cutting dies on the trim press are arranged to cut a single row of articles with each cycle. Therefore, the thermoforming trim press is required to run at a very high cycle speed. For the case of a thermoforming machine that forms eight rows of articles in a single operating cycle, a corresponding trim press has to operate eight cycles for each cycle of the thermoforming machine. Therefore, it is desirable to trim multiple rows of articles with each operating cycle of the trim press.

U.S. Pat. No. 6,692,212 illustrates one apparatus and method for stacking thermoformed containers from a molding machine. More particularly, molded and punched containers are transferred from a molding machine using stacking magazines. The articles can either be ejected directly into the stacking magazines, or they can be transferred into the stacking magazines disposed in a stacking station. However, a stack cage and a transfer device are used to shuttle accumulated containers from multiple rows of dies on a thermomolding machine to a transverse ejector. Such an apparatus and method is relatively complex, requiring multiple stack cages that interrupt the continuous stacking of containers in order to shuttle discrete stacks of containers to the transverse ejector. Furthermore, such an apparatus is difficult and time consuming to maintain if a container jambs in the stack cage during use.

Accordingly, improvements are needed in the manner that thermoformed articles are delivered from multiple levels of a thermoforming machine to a transfer table for further processing, such as during rim rolling and packaging of cups.

SUMMARY OF THE INVENTION

An improved apparatus and method are provided for processing multiple levels of inter-nested stacks of thermoformed articles being received from a thermoforming trim press for delivery to a processing table for further processing. Using a guiding apparatus, multiple levels, or rows of formed articles are delivered to a single, common level for further processing.

According to one aspect, a thermoformed article stack guiding apparatus is provided with a frame, a guide ramp and an array of juxtaposed article guide channels. The guide ramp is carried by the frame and is configured to receive and guide individual stacks of inter-nested articles exiting a female die of a thermoforming trim press from multiple rows and multiple levels. The array of juxtaposed article guide channels is provided on the guide ramp. A first set of article guide channels is inter-nested with a second set of article guide channels in an alternating array. Each of the first set and the second set is spread out laterally in a direction from an entrance end of the guide ramp to an exit end of the guide ramp to accept respective stacks of inter-nested articles from an upper row and a lower row of a trim press and transfer the stacks into a common exit row.

According to another aspect, a thermoforming trim press article output handling apparatus is provided with a support frame and a trough. The trough is provided on the support frame and includes an array of adjacent article guide channels. A first set of article guide channels is commingled with a second set of article guide channels. At least one of the first set and the second set is splayed in a direction from an entrance end of the ramp to an exit end of the ramp. The first set receives adjacent stacks of articles from an upper row of the trim press and the second set receives adjacent stacks of articles from a lower row of the trim press.

According to yet another aspect, an apparatus is provided for orienting stacks of trimmed molded articles. The apparatus includes an article receiving chute. The article receiving chute has an array of juxtaposed article raceways. A first set of article raceways is inter-nested with a second set of article raceways in an alternating array. Each of the first set and the second set is splayed in a direction from an entrance end of the chute to an exit end of the chute to transfer an upper row of stacked articles and a lower row of stacked articles into a single, common row of stacked articles for further processing.

According to even another aspect, a method is provided for arranging molded trimmed articles from multiple, elevationally distinct rows of female dies on a horizontal thermoforming trim press. The method includes: providing an article receiving chute having an array of article guide channels, a first set of article guide channels inter-nested with a second set of article guide channels in an alternating array; receiving a first set of continuous stacks of articles from a lower row of female dies from the trim press into the first set of article guide channels; receiving a second set of continuous stacks of articles from an upper row of female dies from the trim press into the second set of article guide channels; guiding the first set of continuous stacks of articles to diverge apart in a downstream direction; guiding the second set of continuous stacks of articles to diverge apart in a downstream direction; and guiding the second set of continuous stacks of articles into alternating, inter-nesting relation with the first set of continuous stacks of articles at where the first set of continuous stacks of articles are diverged apart to provide the first set and the second set of continuous stacks of articles in a single, common row of stacked articles.

BRIEF DESCRIPTION OF THE DRAWINGS

Preferred embodiments of the invention are described below with reference to the following accompanying drawings.

FIG. 8 illustrates the stack guiding apparatus of FIG. 7 showing a selected stack of inter-nested cups from a selected die on an upper row of the trim press provided above respective stacks of inter-nested cups from adjacent dies on a lower row of the trim press to facilitate internesting of the respective upper and lower rows.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention comprising an apparatus and method for orienting stacks of trimmed molded articles. While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
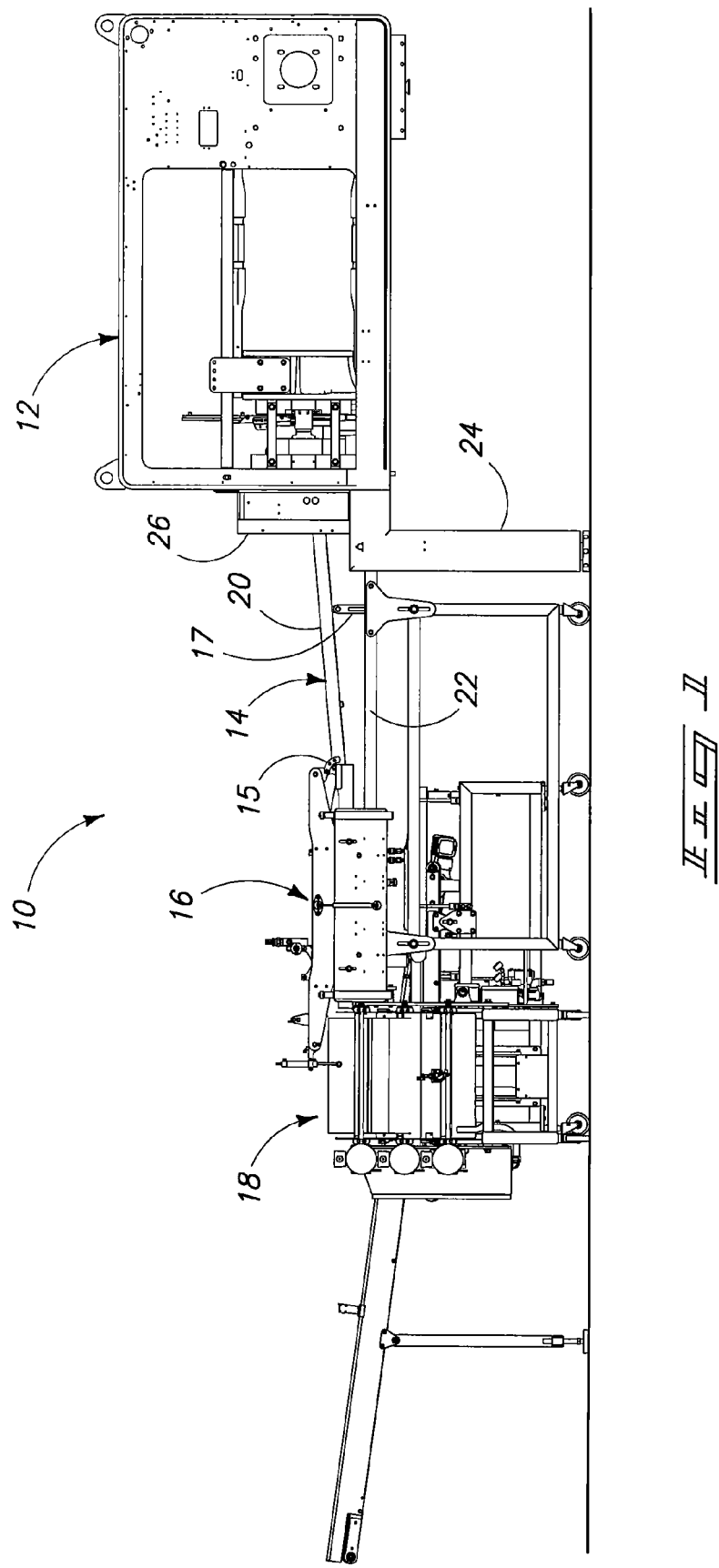
FIG. 1 is a schematic side view representation of a thermoforming article stack guiding apparatus in accordance with a preferred embodiment of the invention illustrating the stack guiding apparatus incorporated into an article stack processing apparatus and provided downstream of an article thermoforming trim press.

FIG. 1 illustrates a thermoformed article stack processing apparatus 10 coupled with a downstream end of a thermoforming trim press 12 and incorporating a stack guiding apparatus 14, according to one aspect of the present invention. In addition to incorporating stack guiding apparatus 14, article stack processing apparatus 10 also includes a stack segmenting apparatus 16 and a stack accumulator 18. A ramp 20 of stack guiding apparatus 14 is mounted onto a frame 22 of article stack processing apparatus 10. A plurality of pivot arms 15 and a pair of laterally spaced-apart slotted adjustment bracket assemblies 17 enable a technician to adjust pitch and entrance height of ramp 20 relative to a female die plate 26 on a trim press 12. A downstream end of ramp 20 merely rests on a table edge of apparatus 16, and pivot arms 15 grip individual baffles on ramp 20. Arms 15 also pivot as ramp 20 is adjusted to a desired pitch. Each arm 15 has an end slot that interfits over a respective baffle on ramp 20. Stack segmenting apparatus 16 is also mounted onto frame 22. Ramp 20 is adjusted to a desirable elevational position relative to a female die plate 26 on a thermoforming trim press 12 using pivot arms 15 and assembly 17. Assemblies 17 use bolts to tighten each slot. Likewise, frame 22 is rigidly fastened onto a frame 24 which supports trim press 12 using threaded fasteners (not shown). Optionally, ramp 20 can be rigidly mounted atop frame 22 at a desired location and pitch.

Figure 2:
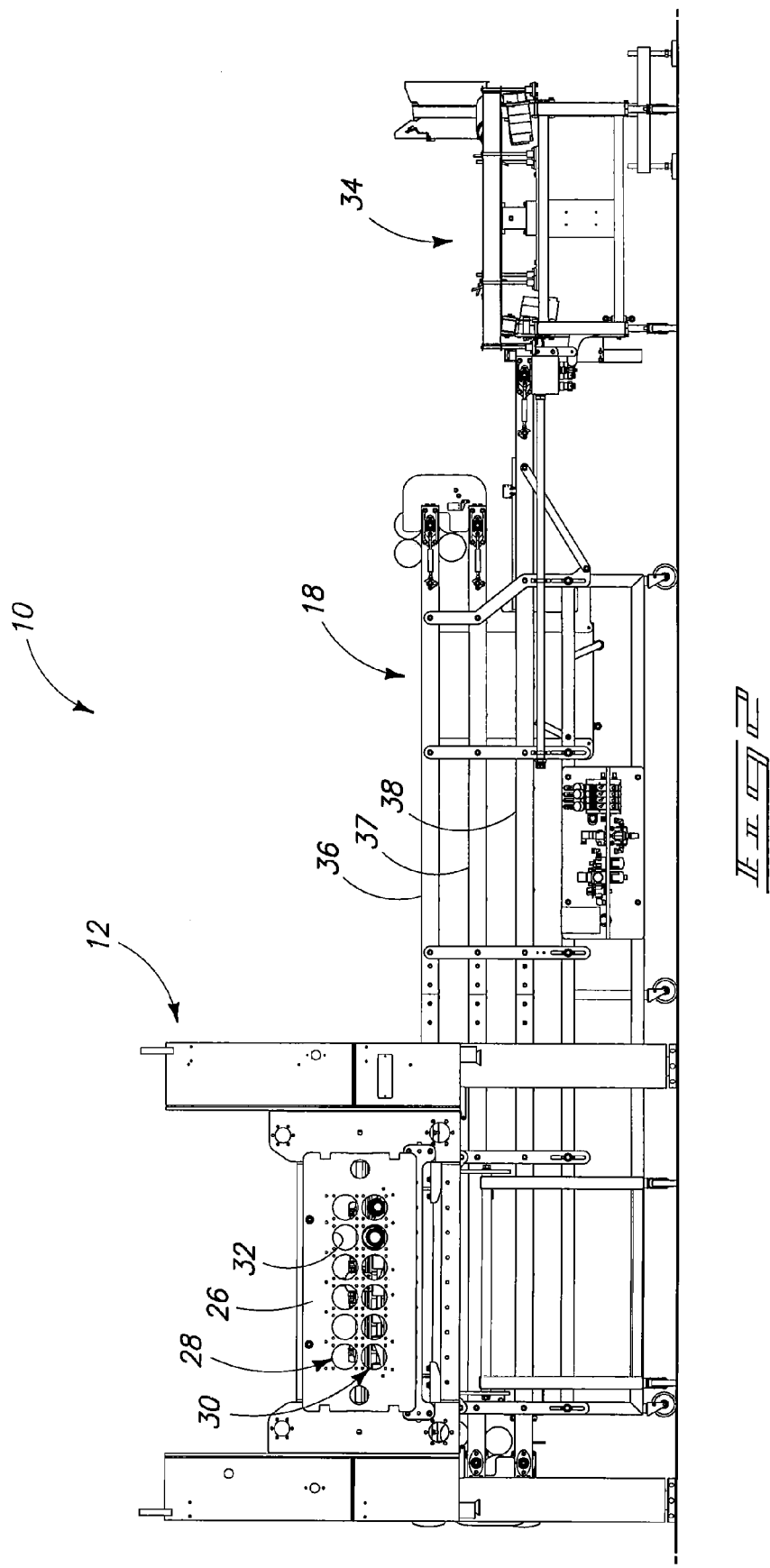
FIG. 2 is a schematic vertical view taken from the right side of the apparatus depicted in FIG. 1 further illustrating the article stack processing apparatus in relation to the thermoforming trim press.

FIG. 2 illustrates article stack processing apparatus 10 positioned in relation to trim press 12, and viewed from an upstream direction of trim press 12. More particularly, portions of trim press 12 have been removed from FIGS. 2-4 to facilitate viewing of female die plate 26, including an arrangement of upper row 28 and lower row 30 of individual female dies 32. Such female dies 32, according to the present construction, are configured to sever thermoformed plastic cups from a sheet of thermoformed plastic material.

Stack accumulator 18 is shown with three separate conveyor tables 36-38 which move individual segmented stacks of cups from stack guiding apparatus 14 (see FIG. 1) where such stacks are accumulated and stored in a queued manner, thereby enabling the storage of cups similar to a mechanical capacitor to provide for a steady distribution of stacked cups to a cup rim rolling machine (not shown) provided downstream of a direction transfer conveyor 34. Direction transfer conveyor 34 is an optional apparatus used to change the direction of motion of stacked cups 180 degrees from a normal travel direction in order to enable placement of the system within a space-limited building. Optionally, conveyor 34 can be eliminated and stack accumulator 18 can deliver individual stacks of cups directly into a rim-rolling machine (not shown), as presently understood in the art.

Figure 3:
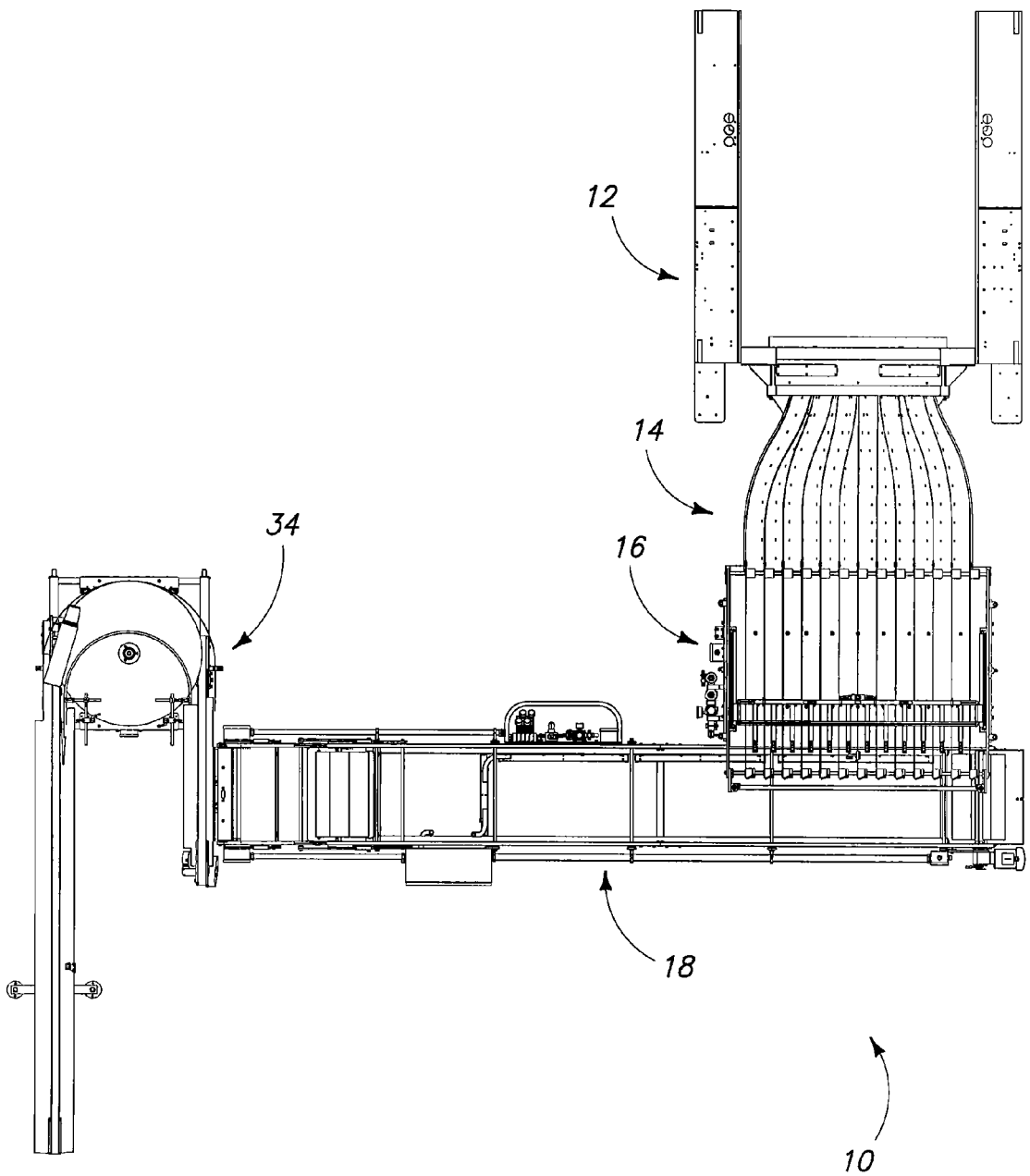
FIG. 3 is a plan view of the article stack processing apparatus and thermoforming trim press of FIGS. 1-2.

FIG. 3 further illustrates, in plan view, the configuration of trim press 12 relative to stack guiding apparatus 14, stack segmenting apparatus 16 and stack accumulator 18. Accordingly, article stack processing apparatus 10 delivers a continuous flow of stacked cups from trim press 12 through stack guiding apparatus 14 where such continuous flow of stacked cups are segmented via stack segmenting apparatus 16 and delivered and stored onto stack accumulator 18 where they are further delivered to conveyor 34. Conveyor 34 changes the direction of travel for stacked cups by 180 degrees for delivery into a cup rim roller (not shown).

Figure 4:
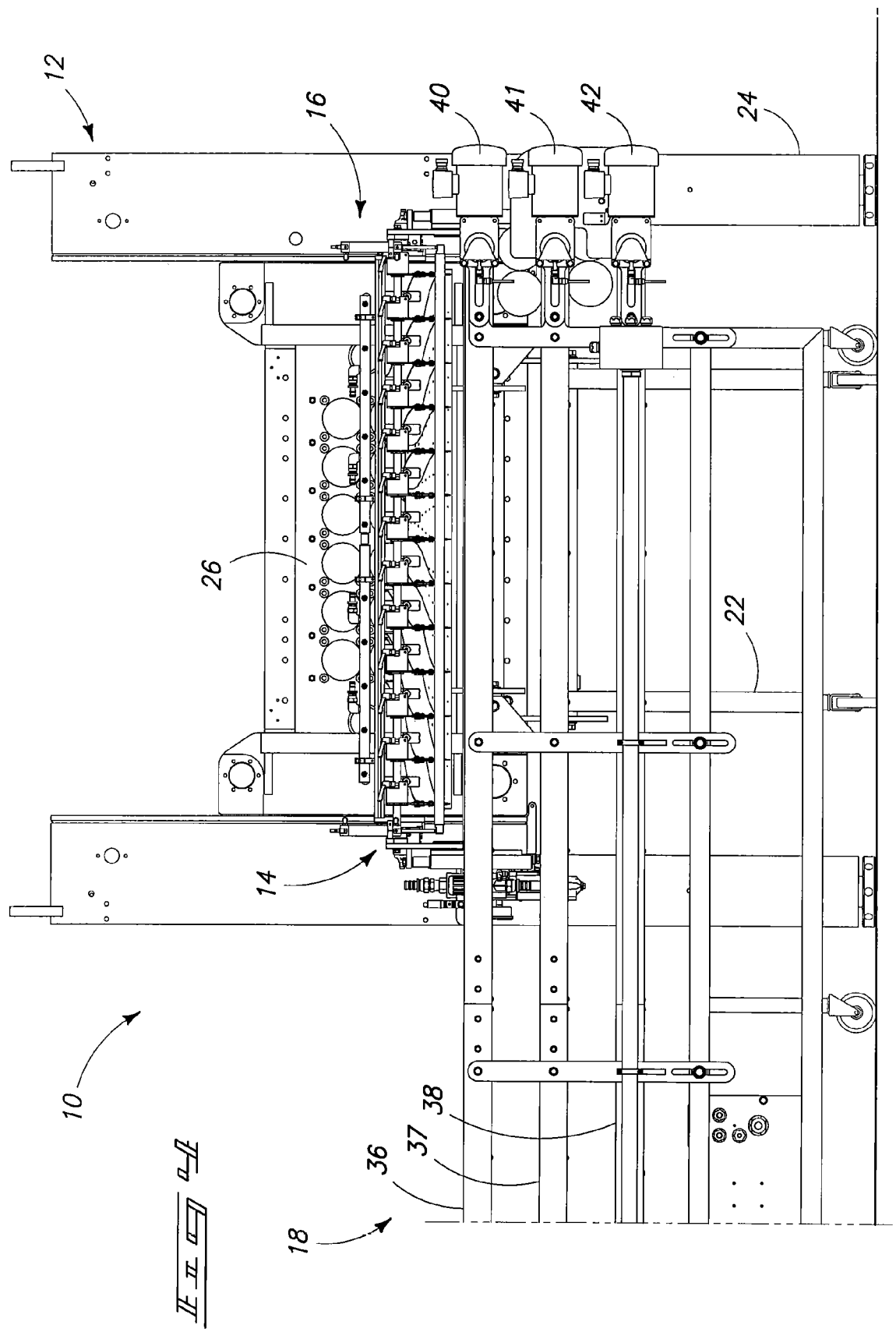
FIG. 4 is a left end view taken relative to the view depicted in FIG. 1 and further illustrating the stack guiding apparatus of the article stack processing apparatus positioned downstream of a thermoforming trim press.

FIG. 4 depicts article stack processing apparatus 10 provided downstream of trim press 12. More particularly, stack guiding apparatus 14 is shown immediately downstream of female die plate 26. Stack segmenting apparatus 16 is shown immediately downstream of stack guiding apparatus 14. Furthermore, stack accumulator 18 is shown downstream of stack segmenting apparatus 16.

More particularly, stack accumulator 18 includes three separately computer-controlled servo drive motors 40-42 which are used to separately control conveyor belts provided on conveyor tables 36-38, respectively. The speed of each belt can be uniquely controlled and tailored to store and deliver sheets of articles. Conveyor table 36 is operated to move stacks of cups away from an exit end of stack segmenting apparatus 16 (in a left direction, as viewed in FIG. 4). Conveyor table 37 is configured to move stacks of cups in a right direction (as viewed in FIG. 4). Finally, conveyor table 38 is configured to move stacks of cups in a left direction (as viewed in FIG. 4). A downstream end of each conveyor table 36-38 includes a slot, or end gap, for dropping individual stacks of cups onto the successive downstream conveyor table where the cups are then redirected in an opposite direction for further delivery to the next conveyor table, or for delivery to a downstream machine, such as conveyor 34 and/or a cup rim rolling machine (not shown). By tailoring the speed of each conveyor belt, the amount of stacked cups stored on stack accumulator 18 can be adjusted.

Figure 5:
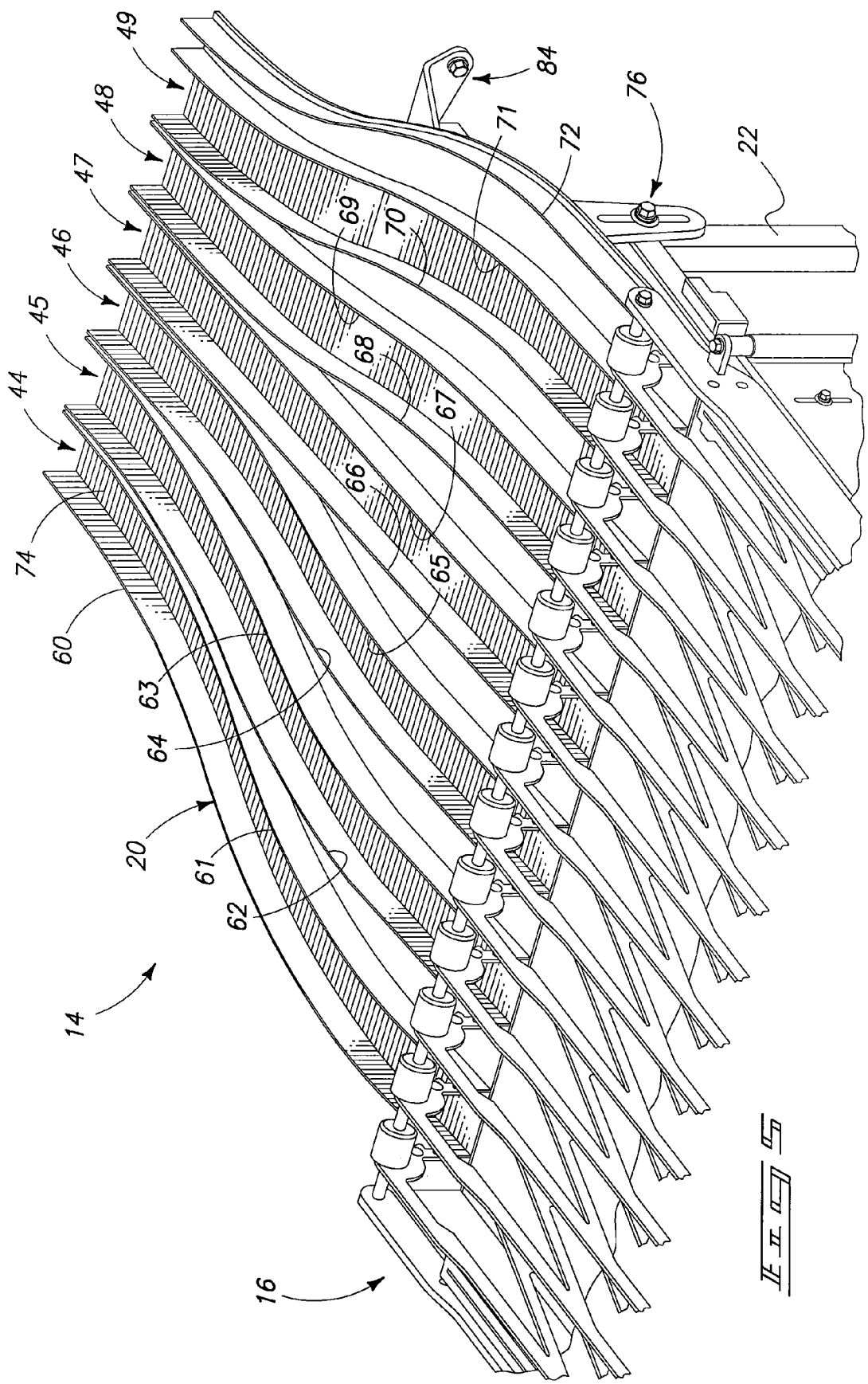
FIG. 5 is an enlarged and simplified schematic perspective view illustrating the stack guiding apparatus of FIGS. 1-4 showing one set of article guide channels emphasized with shading, indicating the one set of article guide channels configured for receiving inter-nested articles from a lower row of the trim press.

FIG. 5 shows article stack guiding apparatus 14 in simplified perspective view with one set of alternating article guide channels 44-49 shown shaded to enhance identification. Article guide channels 44-49 are inter-nested with another set of article guide channels 54-59 (see FIG. 6) in an alternating array along a guide ramp, or chute 20. Channels 44-49 spread out laterally, or splay in a direction from an entrance end of guide ramp to an exit end of the guide ramp. Likewise, channels 54-59 (see FIG. 6) spread out laterally, or splay in a direction from an entrance end of guide ramp 20 to an exit end of the guide ramp. Channels 44-49 and 54-59 are configured to accept respective stacks of inter-nested articles, such as plastic cups, from a lower row and an upper row of a thermoforming trim press. Stacks of cups are moved along ramp 20 due to stacking pressure exerted by the trim press. Gravity can also assist delivery where ramp 20 is downwardly sloped.

According to one construction, guide ramp 20 is sloped downwardly from the entrance end toward the exit end. Alternatively, ramp 20 can be horizontal, or even slightly upwardly inclined, where product output pressure from a trim press moves each stack of articles forward along the ramp. Also according to one construction, each channel 44-46, 48-49 (see FIG. 5) and 54-59 has a serpentine shape, in plan view, such that an entrance end of ramp 20 is narrower than an exit end of ramp 20. In contrast, channel 47 is straight because it is centrally located within ramp 20.

Figure 6:
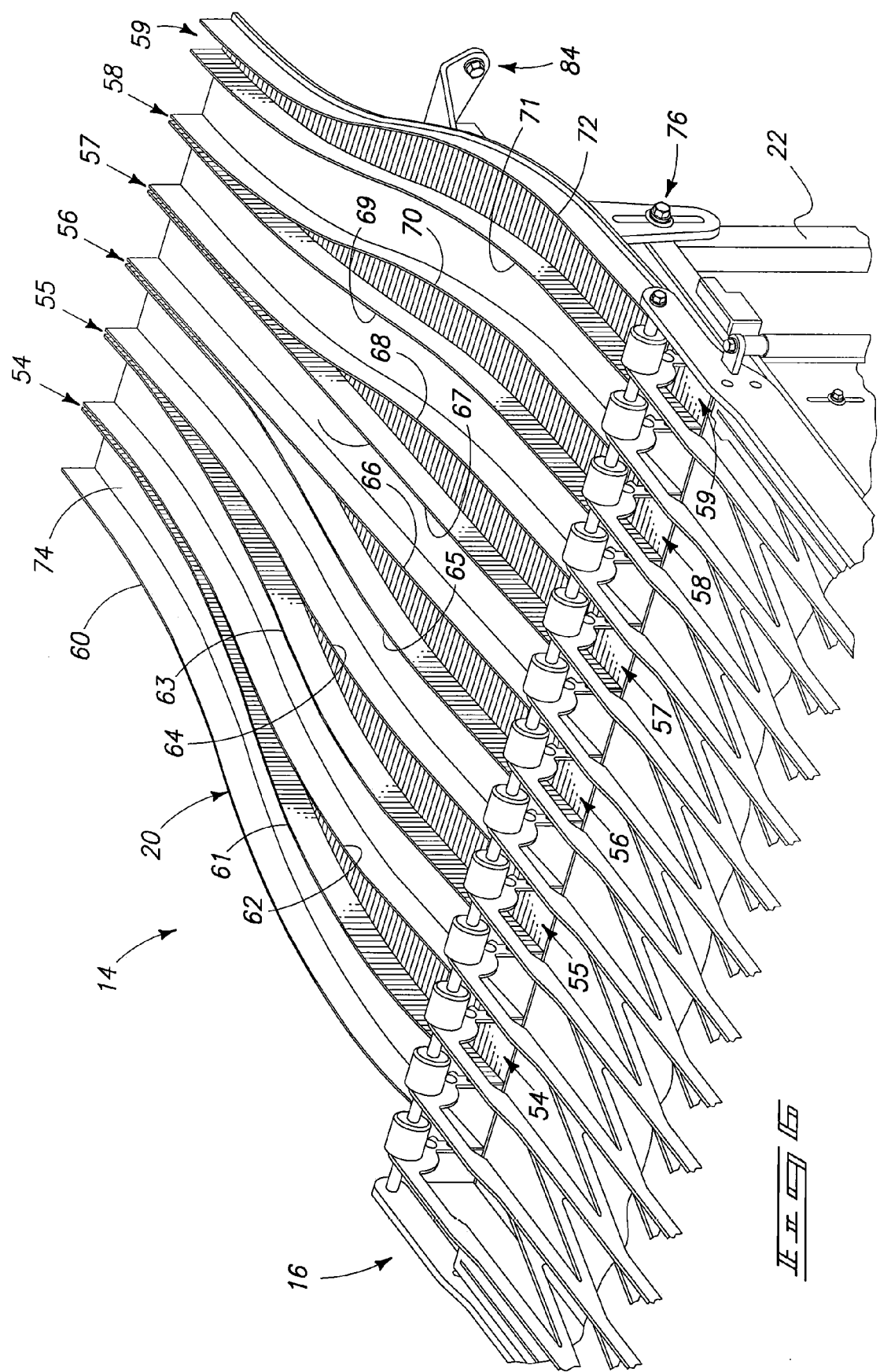
FIG. 6 corresponds with the view depicted in FIG. 5 and illustrates another set of article guide channels emphasized in shading, the other set of guide channels configured to accept respective stacks of inter-nested articles from an upper row of the trim press.

As shown in FIGS. 5-6, an array of vertical baffles 60-72 extend longitudinally atop a base plate 74 of ramp 20. Each channel 44-49 (see FIG. 5) and 54-59 (see FIG. 6) is formed between a pair of vertical baffles 60-72. According to one construction, base plate 74 and baffles 60-72 are cut from 300 series stainless steel sheet metal, with each baffle 60-72 being edge welded onto base plate 74. Optionally, base plate 74 and baffles 60-72 can be constructed from aluminum sheet metal, or some other suitable structural material, such as steel, composite, or plastic material.

Channels 44-49 (see FIG. 5) are configured to receive a plurality of nested, continuous stacks of articles from a lower row 30 of female die plate 26 on trim press 12 (see FIG. 2). Similarly, channels 54-59 (see FIG. 6) are configured to received a plurality of nested, continuous stacks of articles from an upper row 28 of female die plate 26 of trim press 12 (see FIG. 2). Channels 44-49 for the lower row and channels 54-59 for the upper row are provided at elevationally-equivalent locations along ramp 20. Respective pairs of baffles 61,62; 63,64; 65,66; 67,68; 69,70; and 71,72 diverge in a downstream direction to provide channels 54-59 for receiving a respective inter-nested stack of articles from an upper row of a female die for a trim press.

It is understood that a continuous stack of articles, such as cups exiting a trim press die, provides structural stability for the stack via the inter-nesting configuration of the articles. The resulting stack also provides flexibility, similar to a human vertebral column. Accordingly, a continuous stack of cups exits each female die of the upper row of the female die plate and drops in a catenary (or similar) curve into a respective one of channels 54-59 at a location downstream (due to the drop distance provided by the curve of stacked cups). This downstream location ensures that the baffles are spaced apart sufficiently to receive the stack of cups between the spaced-apart baffles. The diverging pairs of vertical baffles correspond with the one set and the another set of guide channels spreading out, or splaying laterally, in a downstream direction.

Figure 7:
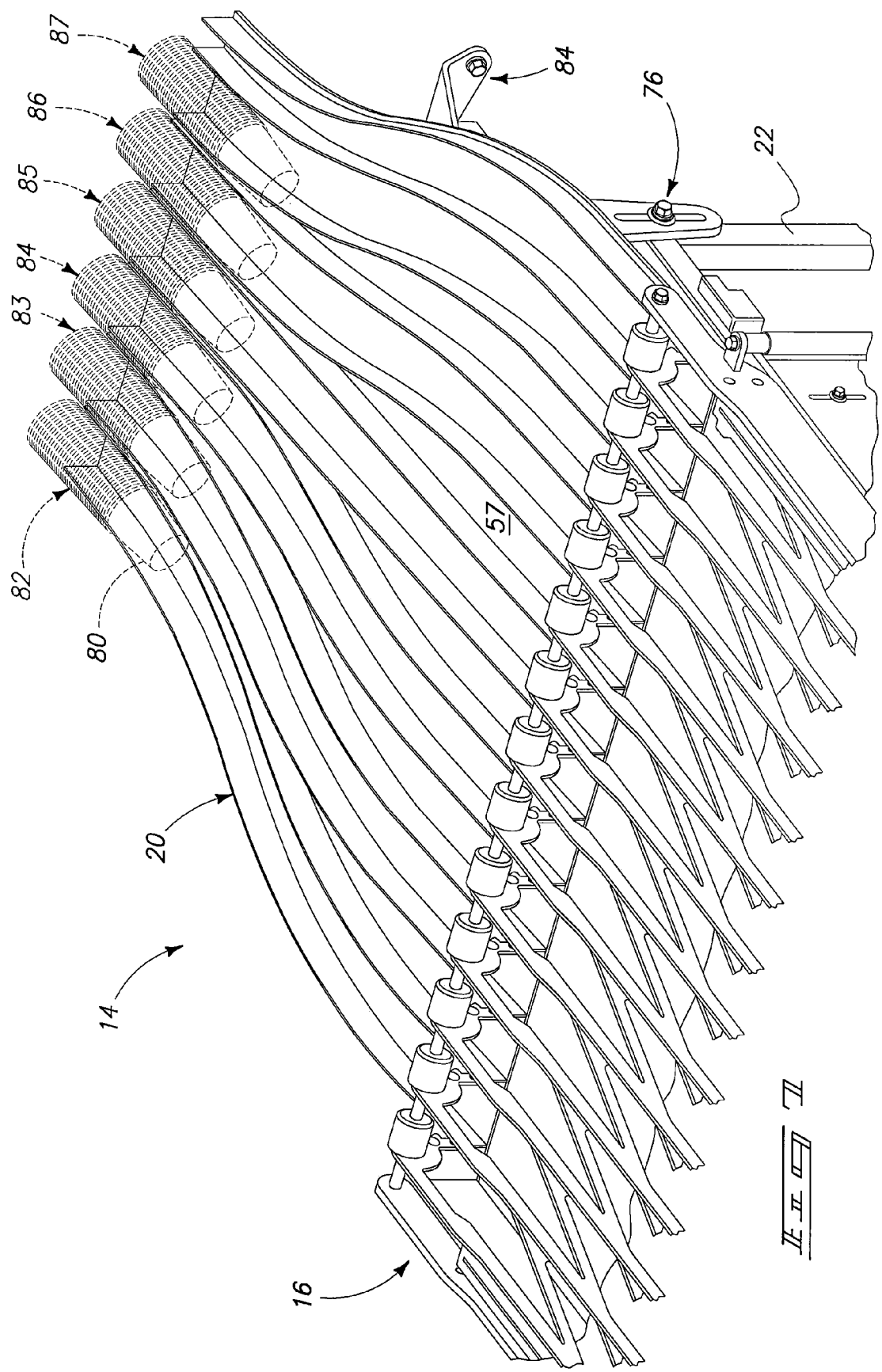
FIG. 7 illustrates the stack guiding apparatus of FIGS. 5-6 with stacks of thermoformed cups received into the one set of article guide channels from the lower row of the trim press.

As shown in FIG. 7, individual stacks 82-87 of cups 80 exit each female die of the lower row of the female die plate directly onto ramp 20 and into respective channels 44-49 (see FIG. 5). Stacks 85 and 86 diverge apart laterally to provide room for channel 57. As shown in FIG. 8, channel 57 receives individual stack 92 of cups 80 between stacks 47 and 48 which guide stacks 85 and 86, respectively. Similar stacks of cups drop and inter-nest into similar channels from each female die in the upper row of the female die plate of the trim press. Such channels can also be used to guide other forms of stacking articles besides cups.

As shown in FIGS. 5 and 6, ramp 20 is pivotally mounted atop frame 22 along a pivot axis where ramp 20 joins an upstream end of stack segmenting apparatus 16. Furthermore, vertical adjustment bracket assemblies 76 are provided on each corner of frame 22 for adjusting height of the table to which ramp 20 is affixed by loosening respective retaining bolts, sliding the bolt in a bracket slot to a desired location, and tightening the bolt in the slot to retain the selected height for the table so as to place a downstream end of ramp 20 at a desired elevational location relative to a lower row on a female die plate for a trim press. Additionally, a pair of frame mounting brackets 84 are provided on each side of frame 22 to retain an upstream end of ramp 20 to a frame 24 of trim press 12 (see FIG. 1).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A thermoformed article stack guiding apparatus, the thermoformed article stack guiding apparatus provided downstream of a trim press having multiple rows of female dies each at a distinct level, comprising:
   a frame;
   a guide ramp carried by the frame and configured to receive and guide individual stacks of inter-nested articles exiting each female die of the upstream thermoforming trim press from multiple rows and multiple levels; and
   an array of juxtaposed article guide channels provided on the guide ramp, a first set of article guide channels inter-nested with a second set of article guide channels in an alternating array, each of the first set of article guide channels and the second set of article guide channels spread out laterally in a direction from an entrance end of the guide ramp to an exit end of the guide ramp to accept respective stacks of inter-nested articles from an upper row and a lower row of a trim press and transfer the stacks into a common exit row;
   wherein selected ones of the guide channels have a serpentine shape such that an entrance end of the ramp is narrower than an exit end of the ramp.

2. The thermoforming article stack guiding apparatus of claim 1, wherein the guide ramp is sloped downwardly from the entrance end to the exit end.

3. The thermoforming article stack guiding apparatus of claim 1, wherein the first set of channels is configured to receive a plurality of continuous stacks of articles from an upper row of the thermoforming trim press and the second set of channels is configured to received a plurality of continuous stacks of articles from a lower row of the thermoforming trim press.

4. The thermoforming article stack guiding apparatus of claim 1, wherein each channel is formed between a pair of vertical baffles.

5. A thermoformed article stack guiding apparatus, the thermoformed article stack guiding apparatus provided downstream of a trim press having multiple rows of female dies, comprising:
   a frame;
   a guide ramp carried by the frame and configured to receive and guide individual stacks of inter-nested articles exiting each female die of the thermoforming trim press from multiple rows and multiple levels; and
   an array of juxtaposed article guide channels provided on the guide ramp, a first set of article guide channels inter-nested with a second set of article guide channels in an alternating array, each of the first set of article guide channels and the second set of article guide channels spread out laterally in a direction from an entrance end of the guide ramp to an exit end of the guide ramp to accept respective stacks of inter-nested articles from an upper row and a lower row of the trim press and transfer the stacks into a common exit row;
   wherein the first set of article guide channels is configured to receive a plurality of continuous stacks of articles from an upper row of the thermoforming trim press and the second set of article guide channels is configured to received a plurality of continuous stacks of articles from a lower row of the thermoforming trim press; and
   wherein the channels for the upper row and the lower row are provided at elevationally-equivalent locations along the ramp, and the channels for the upper row are formed between longitudinal baffles that diverge in a direction from the entrance end to the exit end of the ramp.

6. The apparatus of claim 5, wherein each channel is formed between a pair of vertical baffles.

7. A thermoformed article stack guiding apparatus, the thermoformed article stack guiding apparatus provided downstream of a trim press having multiple rows of female dies, comprising:
   a frame;
   a guide ramp carried by the frame and configured to receive and guide individual stacks of inter-nested articles exiting each female die of the thermoforming trim press from multiple rows and multiple levels; and
   an array of juxtaposed article guide channels provided on the guide ramp, a first set of article guide channels inter-nested with a second set of article guide channels in an alternating array, each of the first set of article guide channels and the second set of article guide channels spread out laterally in a direction from an entrance end of the guide ramp to an exit end of the guide ramp to accept respective stacks of inter-nested articles from an upper row and a lower row of a trim press and transfer the stacks into a common exit row;
   wherein the channels for the upper row are formed between respective pairs of vertical baffles that diverge corresponding with the first and second sets of guide channels spreading out in a downstream direction.

8. The apparatus of claim 7, wherein the ramp is supported by the frame in an inclined orientation extending downwardly from an entrance end toward an exit end, and wherein the first set and the second set of article guide channels commingled in an inter-nested, alternating array of channels.

9. A thermoforming trim press article output handling apparatus, the thermoformed article stack guiding apparatus provided downstream of a trim press having multiple rows of female dies each at a distinct level, comprising:
   a support frame; and
   a trough on the support frame including an array of adjacent article guide channels, a first set of article guide channels commingled with a second set of article guide channels, at least one of the first set and the second set of article guide channels splayed apart in a direction from an entrance end of the ramp to an exit end of the ramp, the first set of article guide channels receiving adjacent stacks of articles from an upper row of the trim press and the second set of article guide channels receiving adjacent stacks of articles from a lower row of the trim press;
   wherein the first set of article guide channels comprises individual channels including a pair of adjacent baffles that diverge along an upstream section to generate the respective channel.

10. The output handling apparatus of claim 9, wherein the trough comprises a ramp.

11. The output handling apparatus of claim 10, wherein the ramp is supported by the frame in an inclined orientation extending downwardly from an entrance end toward an exit end.

12. The output handling apparatus of claim 9, wherein the first set and the second set of article guide channels commingled in an inter-nested, alternating array of channels.

13. The output handling apparatus of claim 9, wherein the first set and the second set are provided in a single, common plane.

14. An apparatus for orienting stacks of trimmed molded articles, the thermoformed article stack guiding apparatus provided downstream of a trim press having multiple rows of female dies, comprising:
   an article receiving chute having an array of juxtaposed article raceways, a first set of article raceways inter-nested with a second set of article raceways in an alternating array, each of the first set and the second set of article raceways splayed in a direction from an entrance end of the chute to an exit end of the chute to transfer an upper row of stacked articles and a lower row of stacked articles into a single, common row of stacked articles for further processing;
   wherein the first set of channels includes sidewalls that diverge adjacent an entrance portion of the receiving chute.

15. The apparatus of claim 14, further comprising a support frame configured to carry the article receiving chute proximate a female die plate on a thermoforming trim press.

16. The apparatus of claim 14, wherein each article raceway comprises a channel for guiding stacked articles.

17. The apparatus of claim 16, wherein the channel comprises a pair of sidewalls extending upwardly from the chute.

18. The apparatus of claim 14, wherein the article receiving chute is sloped from an entrance end to an exit end.

19. A method for arranging molded trimmed articles from multiple, elevationally distinct rows of female dies on a horizontal thermoforming trim press, comprising:
   providing an article receiving chute having an array of article guide channels, a first set of article guide channels inter-nested with a second set of article guide channels in an alternating array;
   receiving a first set of continuous stacks of articles from a lower row of female dies from the trim press into the first set of article guide channels;
   receiving a second set of continuous stacks of articles from an upper row of female dies from the trim press into the second set of article guide channels;
   guiding the first set of continuous stacks of articles to diverge apart in a downstream direction;

guiding the second set of continuous stacks of articles to diverge apart in a downstream direction; and guiding the second set of continuous stacks of articles into alternating, inter-nesting relation with the first set of continuous stacks of articles at where the first set of continuous stacks of articles are diverged apart to provide the first set and the second set of continuous stacks of articles in a single, common row of stacked articles.

20. The apparatus of claim 14, wherein the first set and the second set of article raceways comprise a first set and a second set of channels commingled in an inter-nested, alternating array.

21. The method of claim 19, wherein the first set of continuous stacks of articles are splayed apart by the first set of article guide channels.

22. The method of claim 21, wherein the second set of continuous stacks of articles are splayed apart by the second set of article guide channels.

23. The method of article 22, wherein the first set of article guide channels and the second set of article guide channels are provided side-by-side.

* * * * *

UNITED STATES PATENT AND TRADEMARK OFFICE
CERTIFICATE OF CORRECTION

| | |
|---|---|
| PATENT NO. | : 8,002,102 B2 |
| APPLICATION NO. | : 11/877341 |
| DATED | : August 23, 2011 |
| INVENTOR(S) | : Jere F. Irwin |

It is certified that error appears in the above-identified patent and that said Letters Patent is hereby corrected as shown below:

Col. 6, line 65 - Replace "to received a" with --to receive a--

Col. 7, lines 26-27 - Replace "to received a" with --to receive a--

Signed and Sealed this
Tenth Day of January, 2012

David J. Kappos
*Director of the United States Patent and Trademark Office*